United States Patent
Samuel

(10) Patent No.: US 10,425,268 B2
(45) Date of Patent: Sep. 24, 2019

(54) UART WITH LINE ACTIVITY DETECTOR

(71) Applicant: Microchip Technology Incorporated, Chandler, AZ (US)

(72) Inventor: Roshan Samuel, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/188,464

(22) Filed: Jun. 21, 2016

(65) Prior Publication Data

US 2016/0380798 A1   Dec. 29, 2016

Related U.S. Application Data

(60) Provisional application No. 62/183,272, filed on Jun. 23, 2015.

(51) Int. Cl.
| | |
|---|---|
| *H04L 27/26* | (2006.01) |
| *G06F 13/42* | (2006.01) |
| *H04B 1/16* | (2006.01) |
| *H04L 25/06* | (2006.01) |

(52) U.S. Cl.
CPC ...... *H04L 27/2647* (2013.01); *G06F 13/4295* (2013.01); *H04B 1/16* (2013.01); *H04L 25/069* (2013.01)

(58) Field of Classification Search
CPC ..... H04B 1/16; H04L 27/2647; H04L 25/069; G06F 13/4295
See application file for complete search history.

(56) References Cited

U.S. PATENT DOCUMENTS

| | | | | |
|---|---|---|---|---|
| 4,310,922 A | * | 1/1982 | Lichtenberger | H04J 3/16 370/306 |
| 5,715,077 A | * | 2/1998 | Lahti | H04B 10/11 398/139 |
| 5,728,154 A | * | 3/1998 | Crossett | A61M 1/1086 128/899 |
| 6,385,210 B1 | * | 5/2002 | Overberg | H04L 12/413 370/447 |
| 2004/0233937 A1 | | 11/2004 | Ruat et al. | 370/51.6 |
| 2009/0225784 A1 | * | 9/2009 | Bairanzade | H03M 5/16 370/476 |
| 2012/0314738 A1 | * | 12/2012 | Kashima | H04L 12/403 375/219 |
| 2014/0153623 A1 | * | 6/2014 | Chen | H04L 25/0262 375/224 |

(Continued)

FOREIGN PATENT DOCUMENTS

WO   97/31663 A1   9/1997   ............ A61F 2/02

OTHER PUBLICATIONS

International Search Report and Written Opinion, Application No. PCT/US2016/038614, 11 pages, dated Sep. 1, 2016.

(Continued)

*Primary Examiner* — Syed Haider
(74) *Attorney, Agent, or Firm* — Slayden Grubert Beard PLLC

(57) ABSTRACT

A universal asynchronous receiver/transmitter (UART) module is disclosed. The UART module may include an edge detector coupled with a data line of the UART module, wherein the edge detector resets a counter on a rising and a falling edge.

20 Claims, 4 Drawing Sheets

(56) References Cited

U.S. PATENT DOCUMENTS

2015/0143005 A1\* 5/2015 Vowe .................. G06F 13/4226
 710/106
2016/0205222 A1\* 7/2016 Shaffer .................. H04L 69/16
 709/230

OTHER PUBLICATIONS

European Office Action, Application No. 16734822.6, 4 pages, Jul. 4, 2019.

\* cited by examiner

UART WITH LINE ACTIVITY DETECTOR

CROSS-REFERENCE TO RELATED APPLICATIONS

This application claims priority to U.S. Provisional Patent Application No. 62/183,272, filed Jun. 23, 2015, which is hereby incorporated by reference herein for all purposes.

TECHNICAL FIELD

The present disclosure relates to serial interfaces, in particular to a universal asynchronous receiver/transmitter (UART) interface with line activity detector.

BACKGROUND

UARTs are well known and commonly used in microcontrollers to provide a communication channel. A UART interface translates parallel data into a serial transmission form. Various types of protocols exists and are used in UART communication as defined by various communication standards such as EIA, RS-232, RS-422 or RS-485. Other protocols, such as the DMX protocol use the same interface configuration as a RS-232 interface.

SUMMARY

There exists a need to provide a UART that allows for a timeout period in accordance with certain protocols in a simplified manner that does not rely on a dedicated timer or software.

According to various embodiments, a universal asynchronous receiver/transmitter (UART) module is disclosed. The UART module may include an edge detector coupled with a data line of the UART module, wherein the edge detector resets a counter on a rising and a falling edge.

In some embodiments, the edge detector may include a first edge detector circuit coupled with a receiving line. In such embodiments, an external receiving line is coupled with a buffer and a data recovery unit and wherein the first edge detector is coupled with an output of the data recovery unit. In other such embodiments, the module may further include a first counter which is reset on each rising and falling edge.

In some embodiments, the edge detector may include a second edge detector circuit coupled with a transmitting line. In such embodiments, the module may also include a transmit register coupled with a buffer which is coupled with an external pin and a second edge detector. In other such embodiments, the module may include a second counter which is reset on each rising and falling edge on the transmitting line.

According to various embodiments, a microcontroller is disclosed. The microcontroller may include a universal asynchronous receiver/transmitter (UART) module comprising an edge detector coupled with a data line of the UART module, wherein the edge detector resets a counter on a rising and a falling edge, wherein the microcontroller does not include a dedicated timer for timing a timeout period associated with a communication protocol.

In some embodiments, the edge detector may include a first edge detector circuit coupled with a receiving line. In such embodiments, an external receiving line is coupled with a buffer and a data recovery unit and wherein the first edge detector is coupled with an output of the data recovery unit. In other such embodiments, the module may further include a first counter which is reset on each rising and falling edge.

In some embodiments, the edge detector may include a second edge detector circuit coupled with a transmitting line. In such embodiments, the module may also include a transmit register coupled with a buffer which is coupled with an external pin and a second edge detector. In other such embodiments, the module may include a second counter which is reset on each rising and falling edge on the transmitting line.

According to various embodiments, a universal asynchronous receiver/transmitter (UART) module is disclosed. The module may include a first edge detector circuit coupled with a receiving line, wherein the first edge detector resets a first counter on a rising and a falling edge of the receiving line, and a second edge detector circuit coupled with a transmitting line, wherein the second edge detector resets a second counter on a rising and a falling edge of the transmitting line.

In some embodiments, the receiving line may be coupled with a buffer and a data recovery unit and wherein the first edge detector is coupled with an output of the data recovery unit. In alternative embodiments, a transmit register may be coupled with a buffer which is coupled with an external pin and the second edge detector.

In some embodiments, the first and second timers may be operable to time a timeout period associated with a communication protocol. In such embodiments, the communication protocol may include a digital multiplex protocol. In other such embodiments, the timeout period may be one second.

BRIEF DESCRIPTION OF THE DRAWINGS

Detailed Description

Figure 1:
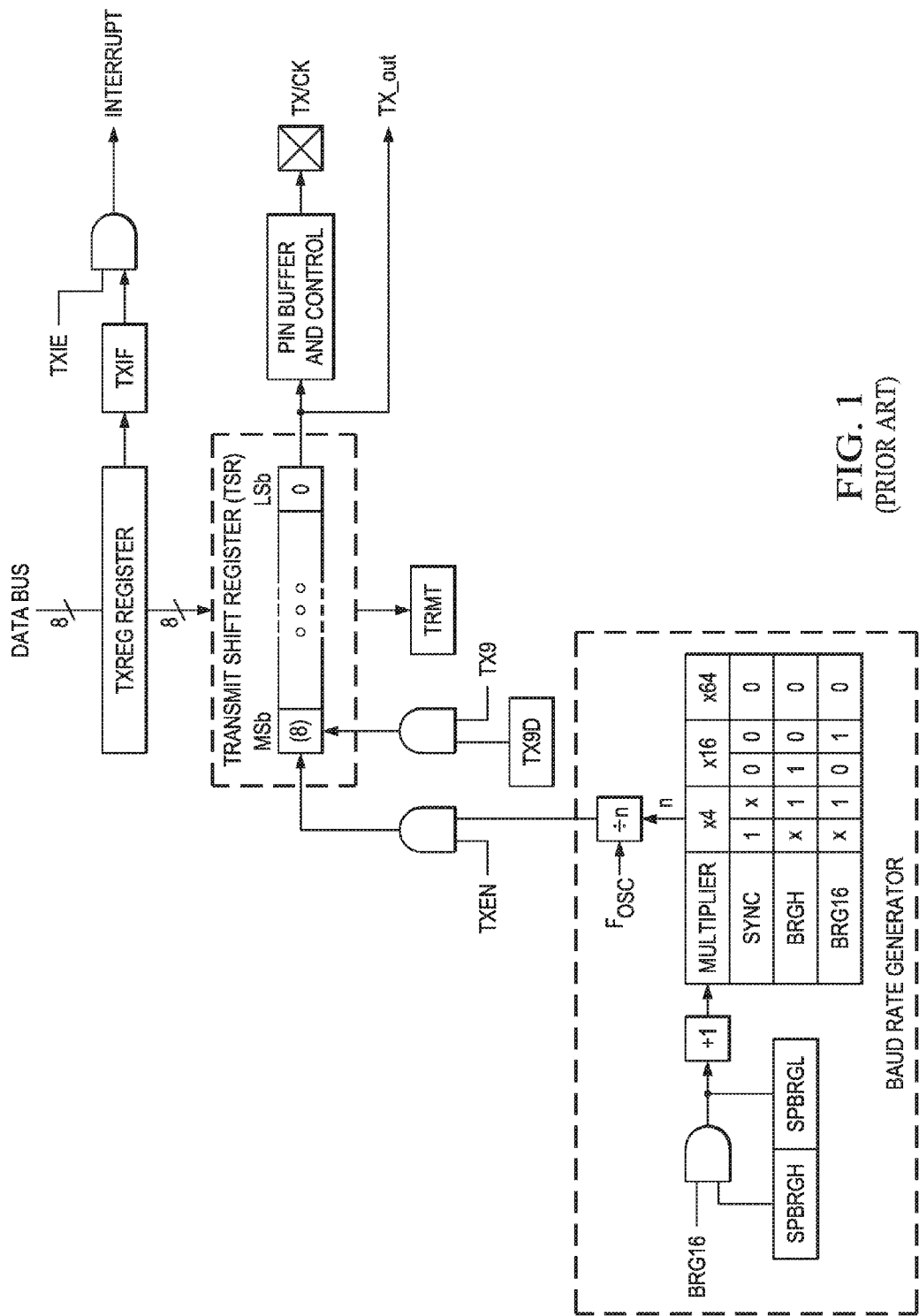
Figure 2:
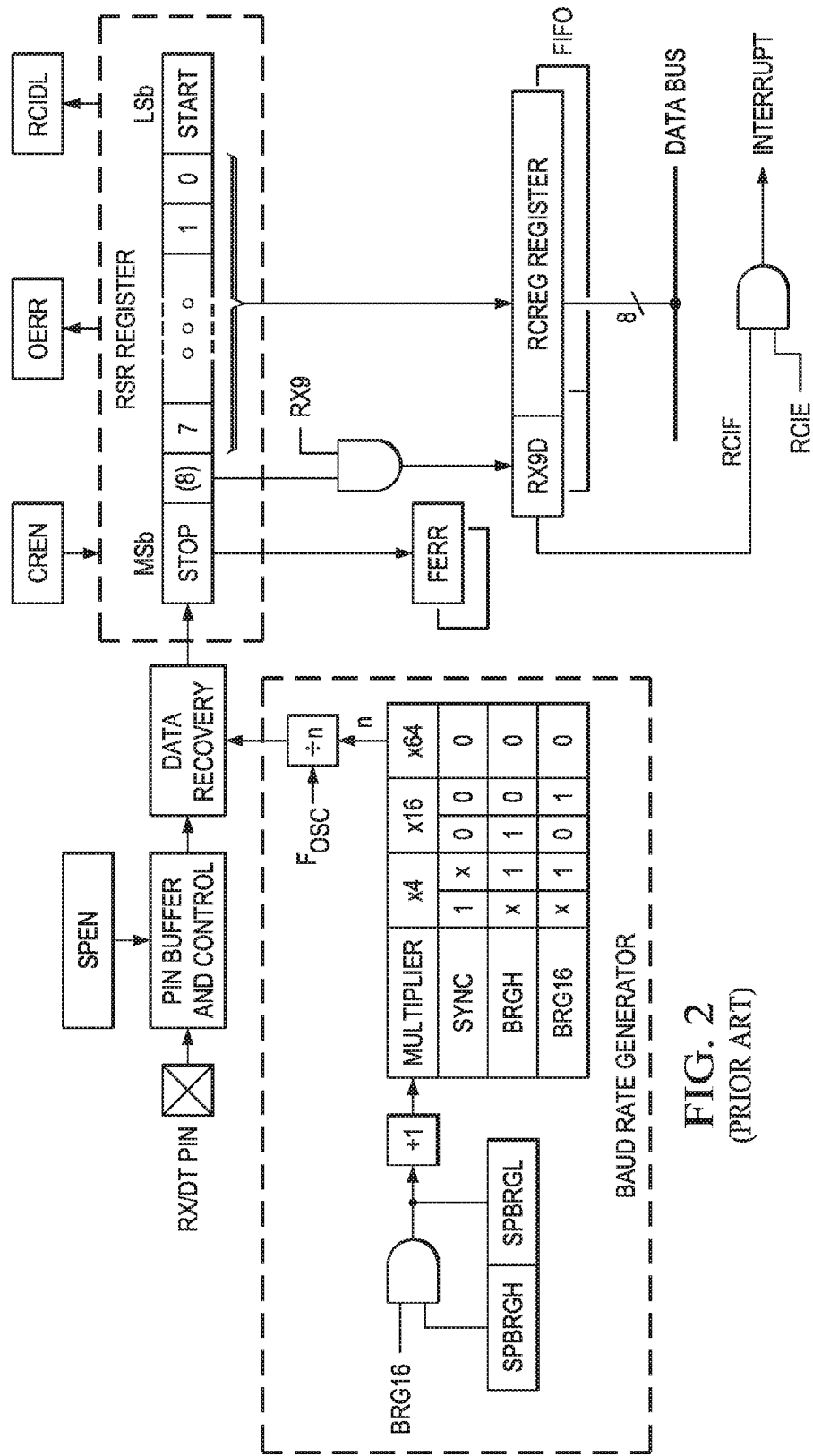
Figure 3:
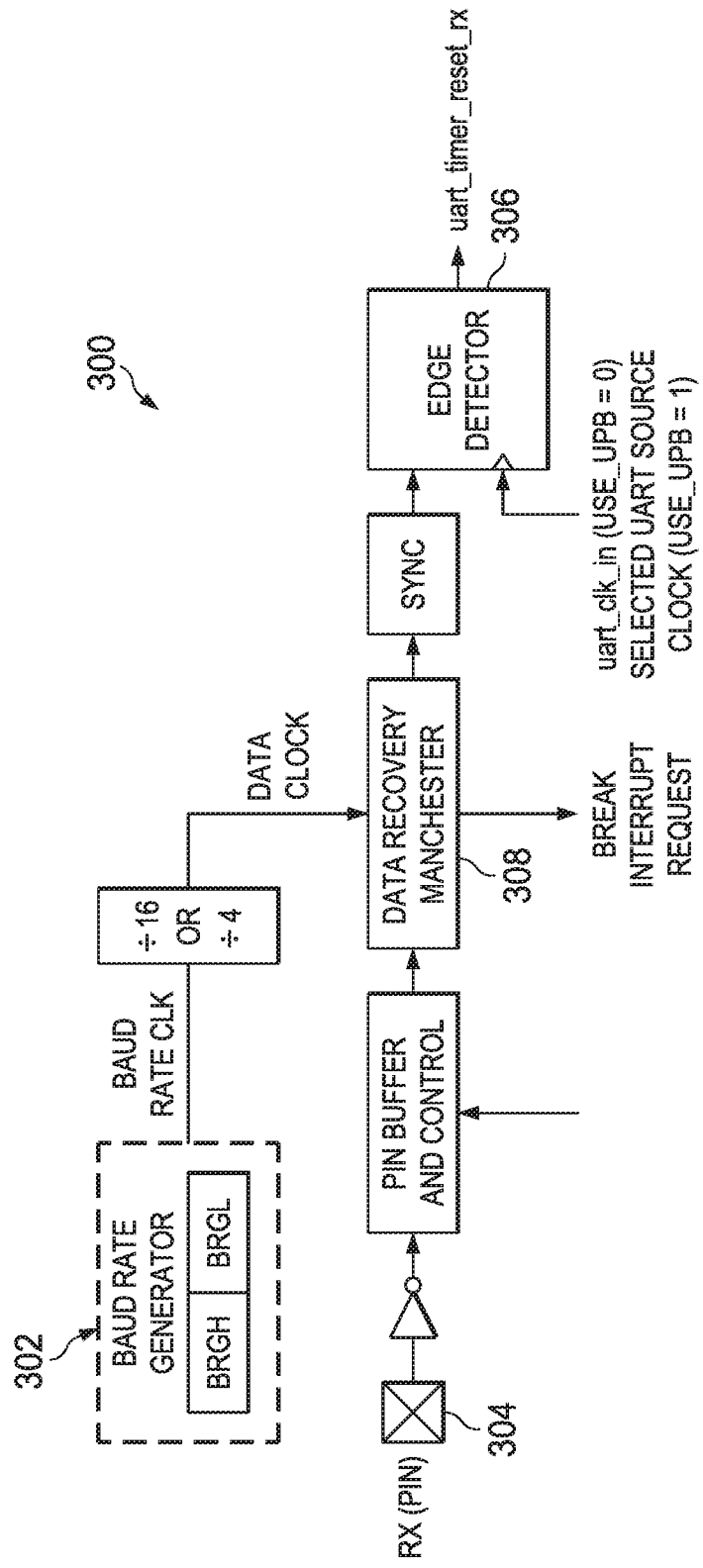
Figure 4:
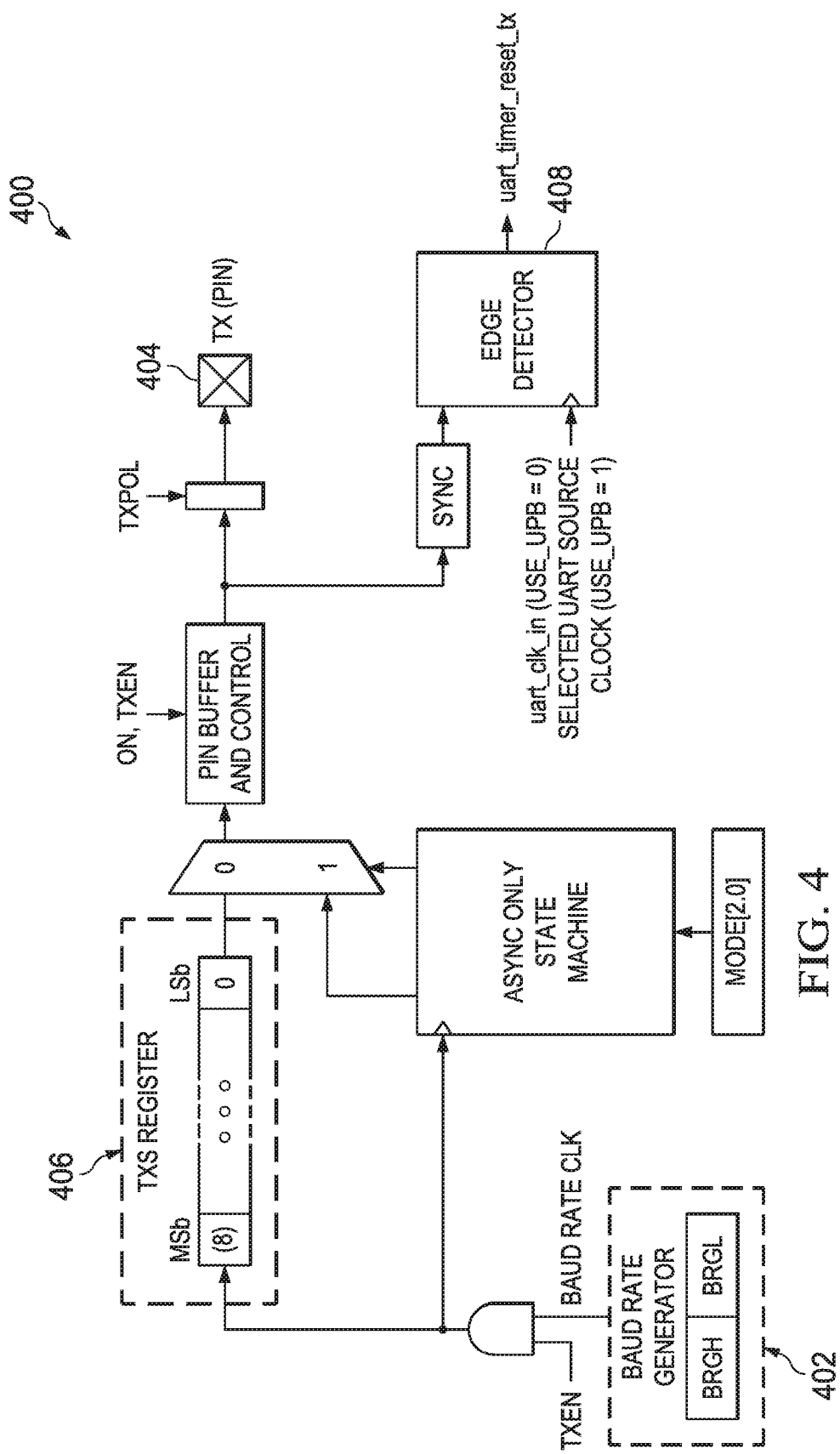

FIG. 1 illustrates an example known transmitter module of a known universal asynchronous receiver transmitter as implemented in known microcontrollers;

FIG. 2 illustrates an example known receiver module of a known universal asynchronous receiver transmitter as implemented in known microcontrollers FIG. 3 illustrates an example receiving UART module for monitoring line transitions, in accordance with certain embodiments of the present disclosure; and FIG. 4 illustrates an example transmission UART module for monitoring line transitions, in accordance with certain embodiments of the present disclosure.

DETAILED DESCRIPTION

Certain known UARTs used by many microcontrollers may be implemented to handle various communication protocols that use a "timeout" period. For example, the digital multiplex ("DMX") protocol implements a timeout period that may be as long as one second. In some embodiments, in an effort to reduce software overhead involved in implementing the timeout period, an activity detector monitors transmissions on a data line to set or reset an onboard timer rather than implementing a software routine.

FIGS. 1 and 2 show a typical conventional universal asynchronous receiver/transmitter as implemented in many microcontrollers. FIG. 1 shows a transmitter module and FIG. 2 an associated receiver module. The UART module is a serial I/O communications peripheral. It contains all the clock generators, shift registers and data buffers necessary to perform an input or output serial data transfer independent of device program execution. The UART, also known as a Serial Communications Interface (SCI), can be configured as a full-duplex asynchronous system. Full-Duplex mode is useful for communications with peripheral systems, such as CRT terminals and personal computers.

In some embodiments, the UART module may include the following additional features that may be useful in, for example, Local Interconnect Network (LIN) bus systems: Automatic detection and calibration of the baud rate; Wake-up on Break reception; 13-bit Break character transmit. During Sleep mode, all clocks to the UART may be suspended. Because of this, the Baud Rate Generator may be inactive and a proper character reception cannot be performed. The Auto-Wake-up feature may allow a coupled microcontroller to wake-up due to activity on a receive/data transmission line. This feature may be available only in Asynchronous mode. An Auto-Wake-up feature may enabled by setting a certain memory portion of UART. For example, the Auto-Wake-up feature may be enabled by setting the wake-up enable ("WUE") bit of a BAUDCON register. Once set, the normal receive sequence on RX/DT line may be disabled, and an Enhanced Universal Synchronous Asynchronous Receiver Transmitter ("EUSART") may remain in an idle state, monitoring for a wake-up event independent of the CPU mode. A wake-up event may consist of, for example, a high-to-low transition on RX/DT line. (This coincides with the start of a Sync Break or a wake-up signal character for the LIN protocol.) The EUSART module may generate a receive interrupt flag (e.g., an RCIF interrupt) coincident with the wake-up event. The interrupt may be generated synchronously to the Q clocks in normal CPU operating modes, and asynchronously if the device is in Sleep mode. The interrupt condition may be cleared by reading another memory portion of the UART (e.g., the RCREG register). The WUE bit may be automatically cleared by the low-to-high transition on the RX line at the end of the Break. This signals to the user that the Break event is over. At this point, the EUSART module may be in Idle mode waiting to receive the next character.

The UART may transmit and receive data using a standard non-return-to-zero (NRZ) format. NRZ is implemented with two levels: a high-voltage output ("VOH") mark state which represents a '1' data bit, and a low-voltage output ("VOL") space state which represents a '0' data bit. NRZ refers to the fact that consecutively transmitted data bits of the same value stay at the output level of that bit without returning to a neutral level between each bit transmission. An NRZ transmission port idles in the mark state. Each character transmission consists of one Start bit followed by eight or nine data bits and is always terminated by one or more Stop bits. The Start bit is always a space and the Stop bits are always marks. The most common data format is eight bits. Each transmitted bit persists for a period of one/(Baud Rate). An on-chip dedicated eight-bit/sixteen-bit Baud Rate Generator is used to derive standard baud rate frequencies from the system oscillator. The UART may transmit and receive the least significant bit first. The UART's transmitter and receiver are functionally independent, but may share the same data format and baud rate. Parity may not be supported according to some embodiments, but may be implemented in software and stored as the ninth data bit. The Asynchronous mode is typically used in RS-232 systems. The receiver block diagram is shown in FIG. 2. The data is received on the RX/DT pin and drives the data recovery block. The data recovery block is actually a high-speed shifter operating at 16 times the baud rate, whereas the serial Receive Shift Register (RSR) operates at the bit rate. When all eight or nine bits of the character have been shifted in, they are immediately transferred to a two character First-In-First-Out (FIFO) memory. The FIFO buffering allows reception of two complete characters and the start of a third character before software must start servicing the UART receiver. The FIFO and RSR registers are not directly accessible by software according to some embodiments. Access to the received data may be given via the RCREG register.

FIGS. 3 and 4 illustrates example UART modules 300, 400, in accordance with certain embodiments of the present disclosure. In some embodiments, UART module 300, 400 may include amongst others the following additional modes of operation: Full-duplex asynchronous transmit and receive; Two-character input buffer; One-character output buffer; Programmable 8-bit or 9-bit character length; Address detection in 9-bit mode; Input buffer overrun error detection; Received character framing error detection; Sleep operation.

Many communication protocols such as the DMX protocol have timeout requirements. However the timeouts may be as long as one second. According to various embodiments, to reduce the number of counter bits, an activity detector monitors transitions on the line to set or reset an on board timer instead of a dedicated timer.

FIG. 3 illustrates an example receiving UART module 300 for monitoring line transitions, in accordance with certain embodiments of the present disclosure. In some embodiments, UART 300 may include edge detector 306 coupled to baud rate generator 302 and receive line 304. Edge detector 306 may be operable to detect an edge of a data line of UART module 300. For example, as illustrated in FIG. 3, edge detector 306 may be operable to detect an edge on RX line 304. An output of edge detector 306 may be coupled to an on-chip timer that may be reset every time activity on the data line (e.g., RX line 304) occurs. In some embodiments, edge detector 306 may also be coupled to an output of a data recovery unit 308. Data recovery unity 308 may be operable to receive an incoming data stream from RX line 304. In such embodiments, UART 300 may also include a counter that is reset every time a falling or rising edge is present in the sampled data stream.

FIG. 4 illustrates an example transmission UART module 400 for monitoring line transitions, in accordance with certain embodiments of the present disclosure. In some embodiments, UART module 400 may include edge detector 408 coupled to baud rate generator 402 and transmit line 404. Edge detector 408 may be operable to detect an edge on TX line 404. In some embodiments, UART module 400 may also include transmit register 406 coupled to a buffer that is coupled with an external pin and edge detector 408. In such embodiments, UART module 400 may include a second counter that reset on each rising and falling edge on the transmitting line.

There exists a need to provide a UART that allows for a timeout period in accordance with certain protocols in a simplified manner that does not rely on a dedicated timer or software.

What is claimed is:

1. A universal asynchronous receiver-transmitter (UART) module comprising:
   a data line;
   a counter configured to count for a period of time;
   an edge detector circuit coupled with the data line, the edge detector circuit configured to:
      reset the counter upon receiving a rising and a falling edge of the data line; and time a timeout period associated with a communication protocol using the counter by identifying the counter reaching a threshold value without being reset upon receipt of a rising and falling edge of the data line.

2. The UART according to claim 1, wherein the edge detector comprises a first edge detector circuit coupled with a receiving line.

3. The UART according to claim 2, wherein an external receiving line is coupled with a buffer and a data recovery unit and wherein the first edge detector is coupled with an output of the data recovery unit.

4. The UART according to claim 2, wherein the first edge detector circuit resets a first counter on each rising edge and falling edge.

5. The UART according to claim 2, wherein the edge detector comprises a second edge detector circuit coupled with a transmitting line.

6. The UART according to claim 5, wherein a transmit register is coupled with a buffer which is coupled with an external pin and the second edge detector.

7. The UART according to claim 5, further comprising a second counter which is reset on each rising edge and falling edge on the transmitting line.

8. A microcontroller comprising:
a counter;
a universal asynchronous receiver-transmitter (UART) module comprising an edge detector coupled with a data line of the UART module, wherein the edge detector is operable to:
reset the counter on a rising edge and a falling edge of the data line; and
time a timeout period associated with a communication protocol using the counter by identifying the counter reaching a threshold value without being reset upon receipt of a rising and falling edge of the data line.

9. The microcontroller according to claim 8, wherein the edge detector comprises a first edge detector circuit coupled with a receiving line.

10. The microcontroller according to claim 9, wherein an external receiving line is coupled with a buffer and a data recovery unit and wherein the first edge detector is coupled with an output of the data recovery unit.

11. The microcontroller according to claim 9, wherein the first edge detector circuit resets a first counter on each rising edge and falling edge.

12. The microcontroller according to claim 8, wherein the edge detector comprises a second edge detector circuit coupled with a transmitting line.

13. The microcontroller according to claim 12, wherein a transmit register is coupled with a buffer which is coupled with an external pin and the second edge detector.

14. The microcontroller according to claim 12, further comprising a second counter which is reset on each rising edge and falling edge on the transmitting line.

15. A universal asynchronous receiver-transmitter (UART) module comprising:
a first edge detector circuit coupled with a receiving data line, wherein the first edge detector is operable to a first counter on a rising edge and a falling edge of the receiving data line; and
a second edge detector circuit coupled with a transmitting data line, wherein the second edge detector resets a second counter on a rising edge and a falling edge of the transmitting data line; wherein:
the first and second edge detector circuits are operable to time a timeout period associated with a communication protocol using the counters by identifying the counters reaching a threshold value without being reset upon receipt of a rising and falling edge of the transmitting and receiving data lines.

16. The UART according to claim 15, wherein the receiving data line is coupled with a buffer and a data recovery unit and wherein the first edge detector is coupled with an output of the data recovery unit.

17. The UART according to claim 15, wherein a transmit register is coupled with a buffer which is coupled with an external pin and the second edge detector.

18. The UART according to claim 15, wherein the communication protocol comprises a digital multiplex protocol.

19. The UART according to claim 15, wherein the timeout period is one second.

20. The UART according to claim 1, wherein the UART module does not include a dedicated timer for timing the timeout period associated with communication protocols.

* * * * *